W. T. DONNELLY.
MARINE TRANSPORTATION VESSEL.
APPLICATION FILED AUG. 13, 1919.
1,335,278.
Patented Mar. 30, 1920.
5 SHEETS—SHEET 1.
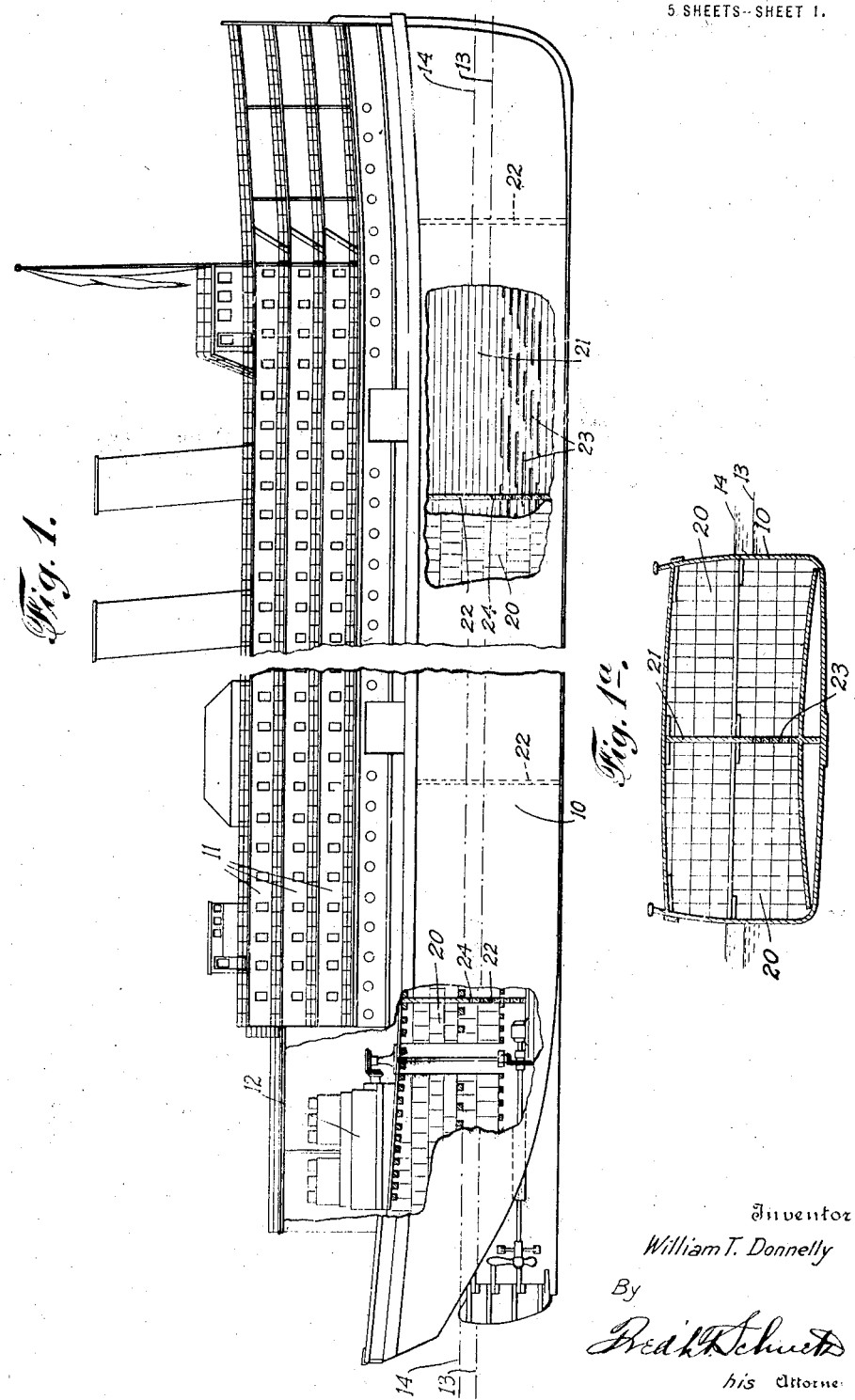
Inventor
William T. Donnelly
By
Fred'k Schuetz
his Attorney W. T. DONNELLY.
MARINE TRANSPORTATION VESSEL.
APPLICATION FILED AUG. 13, 1919.
1,335,278.
Patented Mar. 30, 1920.
5 SHEETS—SHEET 2.
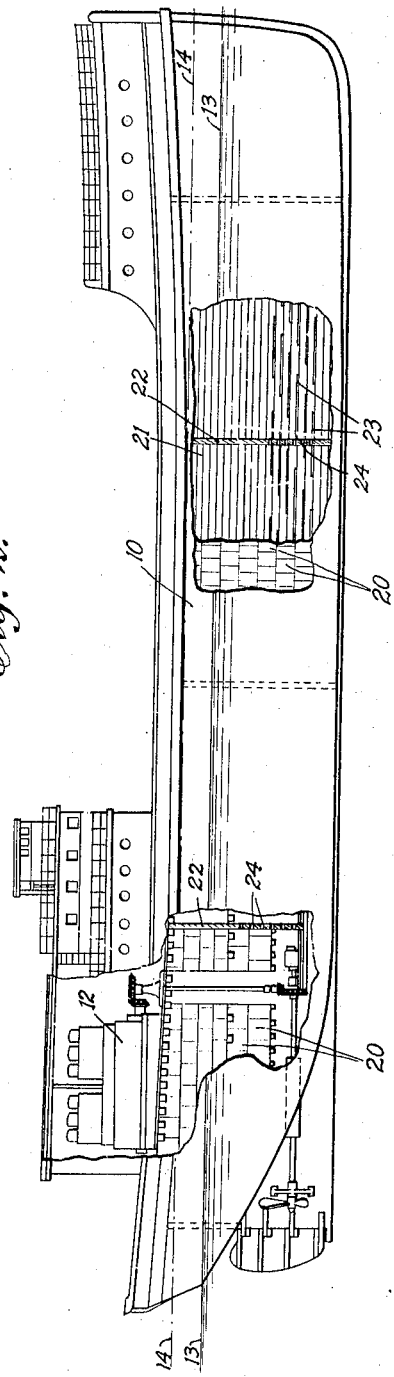
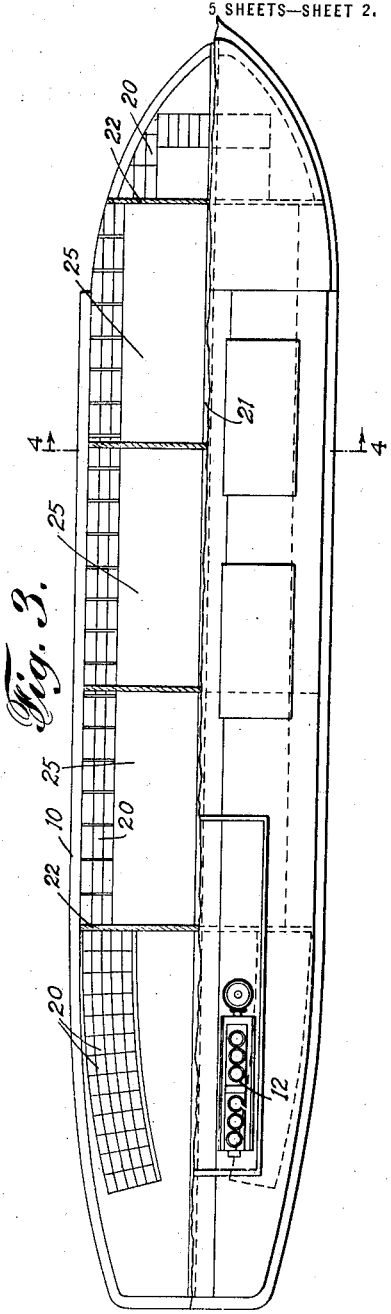
Inventor
William T. Donnelly
By his Attorney W. T. DONNELLY.
MARINE TRANSPORTATION VESSEL.
APPLICATION FILED AUG. 13, 1919.
1,335,278.
Patented Mar. 30, 1920.
5 SHEETS—SHEET 3.
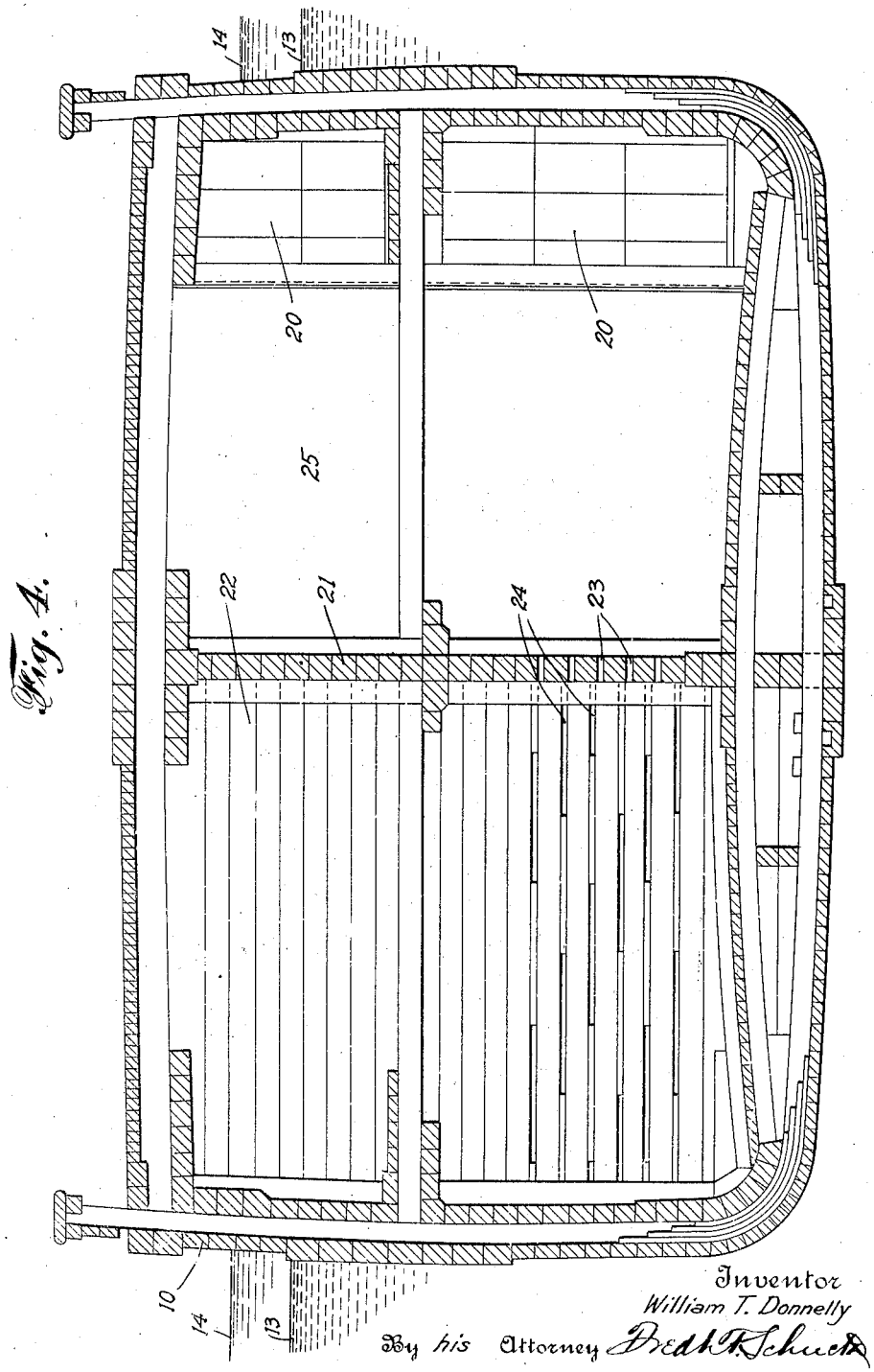

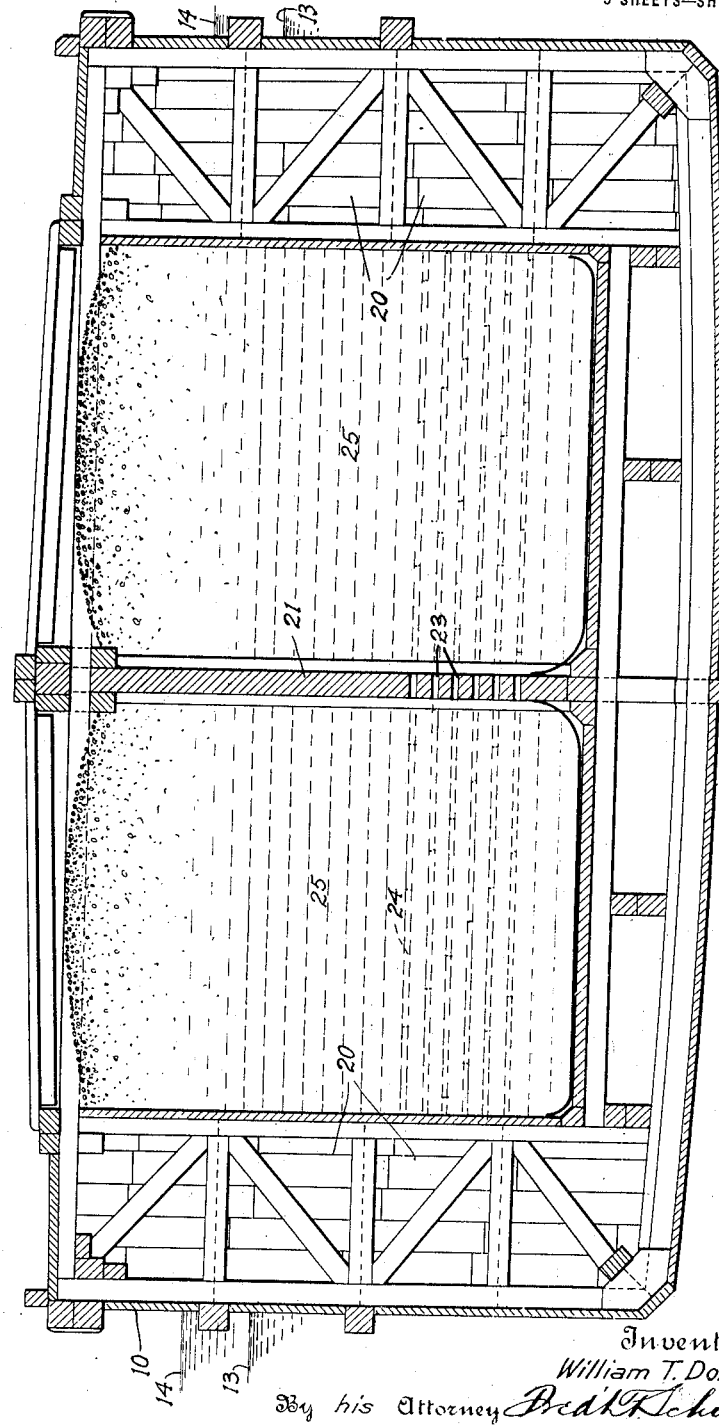

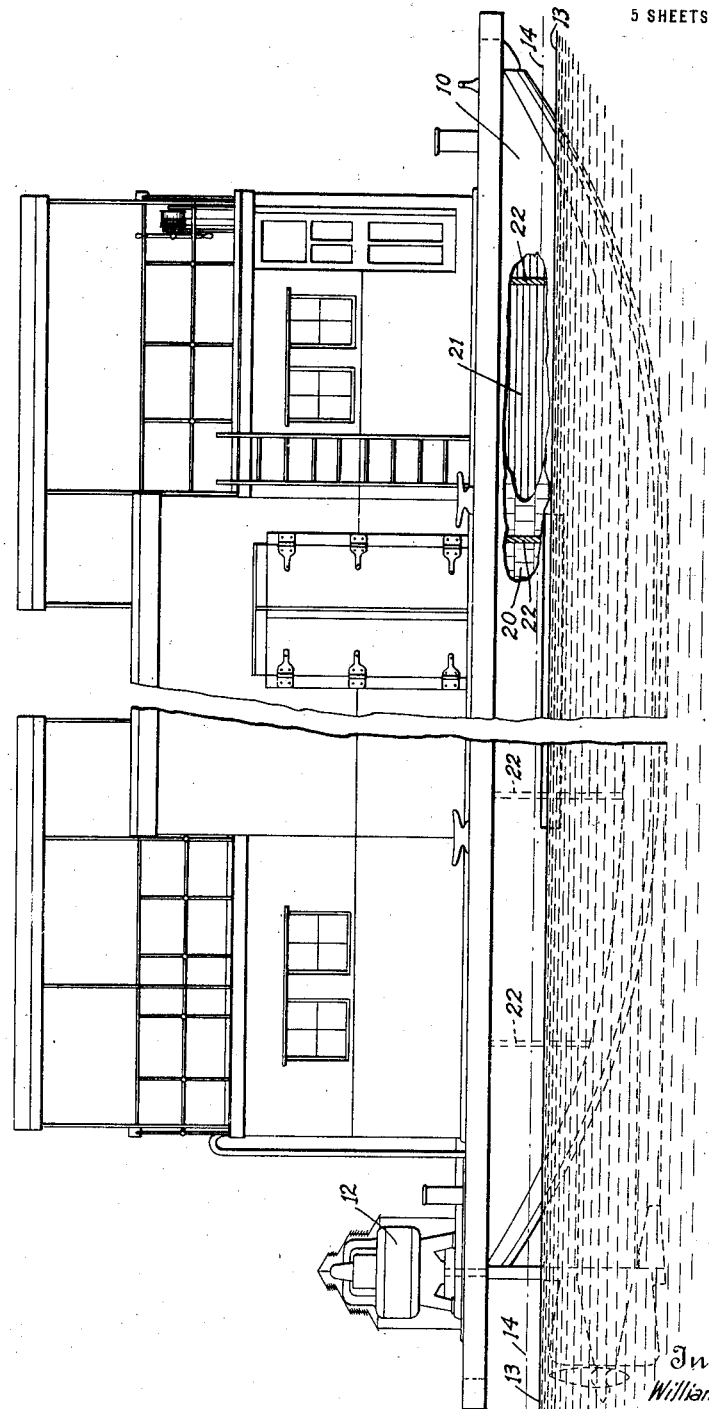

UNITED STATES PATENT OFFICE.

WILLIAM T. DONNELLY, OF BROOKLYN, NEW YORK.

MARINE TRANSPORTATION VESSEL.

1,335,278.       Specification of Letters Patent.    Patented Mar. 30, 1920.

Application filed August 13, 1919. Serial No. 317,108.

*To all whom it may concern:*

Be it known that I, WILLIAM T. DONNELLY, a citizen of the United States, and a resident of Brooklyn, in the county of Kings and State of New York, have invented certain new and useful Improvements in Marine Transportation Vessels, of which the following is a specification.

The invention relates to a marine transportation unit which may be adapted for freight or for passenger service, and has for its object to render the same safe. In a vessel constructed in accordance with the present invention, not only will the security of the lives of passengers be provided for, but the marine risk on ship and cargo, where the latter is also carried, reduced in whole or in part, and the vessel's owner insured against direct loss or against loss as a result of salvage operations. Due to the novel construction set forth, the security aforesaid obviates the necessity of obtaining marine insurance which, as a rule, entails an extremely heavy charge; and, furthermore, there is no necessity for payment of salvage fees.

The nature of the invention will be best understood when described in connection with the accompanying drawings, which illustrate several types of vessels embodying the invention.

Figure 1 thereof illustrates a passenger or excursion vessel rendered safe in accordance with the invention, and having portions broken away to disclose the interior.

Fig. 1ª is a fragmentary cross-section of the hull of such vessel.

Fig. 2 illustrates a freighter similarly safe-guarded and constructed to receive cargo within the hull.

Fig. 3 is a deck plan of same with portions broken away.

Fig. 4 is a detail vertical cross-section taken on the line 4—4, Fig. 3; and Fig. 5 is a transverse section through a loaded barge or like vessel.

Fig. 6 is a side elevation of a freight-carrying vessel, designed to receive the load above deck.

Similar characters of reference designate corresponding parts throughout the several views.

Referring to the drawings, 10 designates the hull, for example of a pleasure craft or excursion boat, the same being constructed of wood or metal and provided with a plurality of decks 11, which are designed for the accommodation of the passengers. The vessel also carries a power plant 12 which may consist of any suitable prime mover, such as an internal combustion engine, steam engine or the like. It will be observed that this power plant 12 is located entirely above the normal water-line 13 as well as above the water-line 14 of the vessel when waterlogged. Where screw propulsion is employed, the transmission from engine to propeller should be of such a nature as not to be interfered with or placed out of action by the presence of water; and any suitable transmission, such as that illustrated, may be employed for this purpose, the same, however, being well known and forming no particular part of the invention.

The hull, particularly in the case of a pleasure vessel, such as is shown in Figs. 1 and 1ª, is designed to be substantially filled with water-tight buoyancy boxes 20 of any suitable construction, and sufficient in total volume to float the entire hull, super-structure and load to the flooded water-line 14, thereby leaving the power plant undamaged and in perfect operating condition in the event of the vessel's becoming waterlogged through damage to said hull. These buoyancy boxes are so distributed throughout the hull as to provide for satisfactory stability of the vessel in its waterlogged condition. To this end, the vessel, when of wood, may be constructed in accordance with the design shown in my co-pending application Serial No. 205,799, filed December 6th, 1917, and in which there is employed a longitudinal bulkhead 21 integral with the stem and stern of the vessel and, also, transverse bulkheads 22. In accordance with the invention, these bulkheads are all provided with suitable openings or slits 23 and 24 respectively, constituting swash bulkheads to allow of proper distribution of water throughout the entire hull in case of leakage in one portion, and are of such dimensions as to insure against undue and dangerous surgings of the water.

In the case of a freighter, Figs. 2 to 6, the load may be carried both below and above deck, suitable compartments 25, Figs.

3, 4 and 5, being provided in the former case. Where the load consists of material which may be readily loaded in bulk and will not be affected by water, the entire load may be placed in the hull itself, as shown in Fig. 5 which is shown simply as a barge, sufficient space being reserved along the sides of the vessel for the necessary volume of buoyancy boxes to safeguard the same; and, in the case of the vessel shown in Figs. 2 to 4, also the power plant against water damage in the event of flooding of said hull.

Otherwise, the entire hull below the working deck may be occupied by buoyancy boxes, as in the case of the passenger vessel shown, and suitable compartments provided above that deck for the freight, as indicated in Fig. 6. In both instances, therefore, the power plant remains intact and the vessel is able to proceed under its own power when partially or entirely waterlogged, and with proper stability to obviate any serious consequences from this source. Marine insurance other than fire risk thereon may thus be dispensed with and no salvage charges will have to be met. Moreover, a sense of security will be experienced by passengers, in the case of vessels of this character, which cannot be present when traveling on the usual type of vessel even though the latter should be provided with the usual and well-known water-tight bulkhead construction. These bulkheads, as a rule, cause unequal and dangerous stresses in case of collision or other damage to the hull when the flooding of one or two compartments may seriously affect the stability of the bulkheads which are necessarily flat and unsuited to stand heavy pressures and often fail through the surging of the sea; whereas, on account of their great number, only a few of the buoyancy boxes may possibly be broken open due to collision, striking of a rock, or other accident to the hull. Furthermore, there being no rigid connection between these buoyancy boxes, a flexibility of installation is possible, permitting them to adjust themselves, as aforesaid, to any new strain arising from the flooding of the hull. The swash bulkheads, moreover, although permitting free passage or circulation of the water throughout the vessel, sufficiently damp the surgings of same to prevent a temporary unequal distribution, which might prove disastrous. The entire vessel, also, is designed to accommodate variable deck loads without impairing the stability of the vessel.

By means of the expedients hereinbefore described, a vessel is afforded with flotation and stability properly safeguarded and having power to proceed even when waterlogged, being maintained entirely seaworthy.

I claim:

1. A vessel for marine transportation, having in combination: a plurality of water-tight and independent containers or buoyancy boxes distributed throughout the vessel in quantity sufficient to maintain the vessel afloat when completely waterlogged, and swash bulkheads distributed throughout said vessel to damp the surgings of the water when the vessel is flooded, though allowing of circulation of same throughout the vessel.

2. A vessel for marine transportation, having in combination: a plurality of water-tight and independent containers or buoyancy boxes distributed throughout the vessel in quantity sufficient to maintain the vessel afloat when completely waterlogged, a power plant for propelling said vessel and located therein above the waterlogged line so as to permit same to proceed under its own power, and swash bulkheads distributed throughout said vessel to damp the surgings of the water when the vessel is flooded, though allowing of circulation of same throughout the vessel.

3. A vessel for marine transportation, having in combination: a plurality of water-tight and independent containers or buoyancy boxes distributed throughout the vessel in quantity sufficient to maintain the vessel afloat when completely waterlogged, a power plant for propelling said vessel and located therein above the waterlogged line so as to permit same to proceed under its own power, and swash bulkheads distributed transversely of said vessel to damp the surgings of the water when the vessel is flooded, though allowing of circulation of same throughout the vessel.

4. A vessel for marine transportation, having in combination: a plurality of water-tight and independent containers or buoyancy boxes distributed throughout the vessel in quantity sufficient to maintain the vessel afloat when completely waterlogged, a power plant for propelling said vessel and located therein above the waterlogged line so as to permit same to proceed under its own power, and swash bulkheads distributed transversely and longitudinally of said vessel to damp the surgings of the water when the vessel is flooded, though allowing of circulation of same throughout the vessel.

Signed at New York, in the county of New York and State of New York, this 7th day of August, A. D. 1919.

WILLIAM T. DONNELLY.